(12) United States Patent
Attar

(10) Patent No.: US 11,907,306 B2
(45) Date of Patent: Feb. 20, 2024

(54) SYSTEMS AND METHODS FOR CLASSIFYING DOCUMENTS

(71) Applicant: Capital One Services, LLC, McLean, VA (US)

(72) Inventor: Aaron Attar, Dallas, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 41 days.

(21) Appl. No.: 17/568,004

(22) Filed: Jan. 4, 2022

(65) Prior Publication Data

US 2023/0214428 A1 Jul. 6, 2023

(51) Int. Cl.
| | |
|---|---|
| *G06F 16/906* | (2019.01) |
| *G06F 16/93* | (2019.01) |
| *G06V 10/82* | (2022.01) |
| *G06V 30/18* | (2022.01) |
| *G06V 30/19* | (2022.01) |
| *G06V 30/418* | (2022.01) |
| *G06V 30/14* | (2022.01) |
| *G06V 30/413* | (2022.01) |

(52) U.S. Cl.
CPC ............ *G06F 16/906* (2019.01); *G06F 16/93* (2019.01); *G06V 10/82* (2022.01); *G06V 30/14* (2022.01); *G06V 30/18* (2022.01); *G06V 30/19* (2022.01); *G06V 30/413* (2022.01); *G06V 30/418* (2022.01)

(58) Field of Classification Search
CPC ....... G06F 16/906; G06F 16/93; G06V 10/82; G06V 30/14; G06V 30/18; G06V 30/19; G06V 30/413; G06V 30/418
See application file for complete search history.

(56) References Cited

U.S. PATENT DOCUMENTS

| | | | |
|---|---|---|---|
| 9,292,737 B2 | 3/2016 | Nepomniachtchi et al. | |
| 2013/0195360 A1* | 8/2013 | Krishna Kumar ... | G06V 30/146 382/182 |
| 2017/0148033 A1* | 5/2017 | McCormick ....... | H04N 1/32267 |
| 2019/0220660 A1* | 7/2019 | Cali ........................ | G06V 30/40 |
| 2020/0394396 A1* | 12/2020 | Yanamandra ........ | G06V 30/416 |

FOREIGN PATENT DOCUMENTS

WO     2017069741 A1     4/2017

\* cited by examiner

*Primary Examiner* — Irete F Ehichioya
*Assistant Examiner* — Xiaoqin Hu
(74) *Attorney, Agent, or Firm* — TROUTMAN PEPPER HAMILTON SANDERS LLP; Christopher J. Forstner; John A. Morrissett

(57) ABSTRACT

A system may iteratively scan a portion of a document, extract first data from the portion of the document, and determine, using a trained model, whether the first data corresponds to one or more document types based on one or more confidence thresholds. The system may repeat this process, increasing the portion of the document scanned by a predetermined amount each iteration, until the first data corresponds to the one or more document types based on the one or more confidence thresholds. Responsive to determining the first data corresponds to the one or more document types based on the one or more confidence thresholds, the system may cause a graphical user interface (GUI) of a user device to display a notification indicating a document type match.

20 Claims, 5 Drawing Sheets

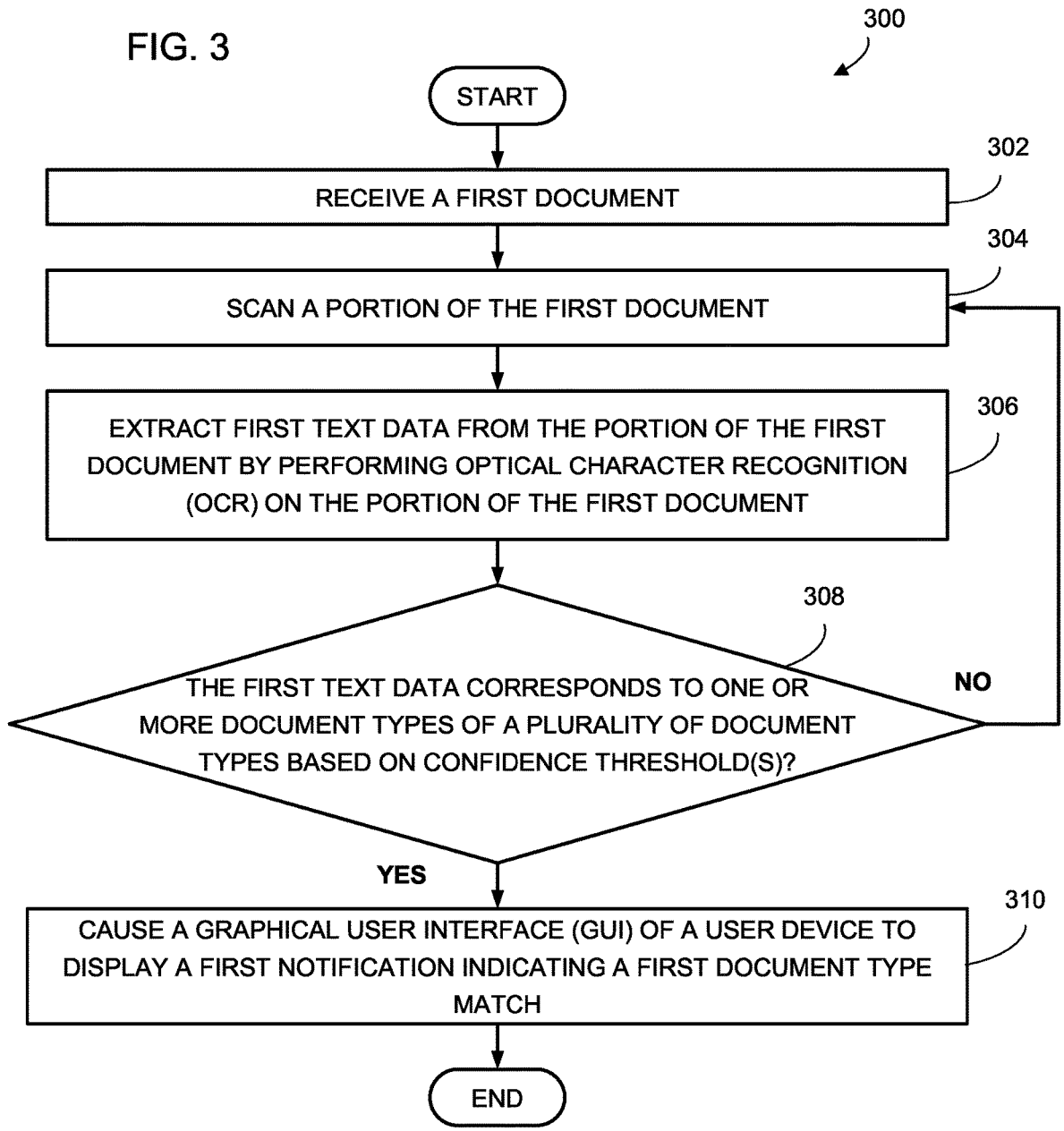

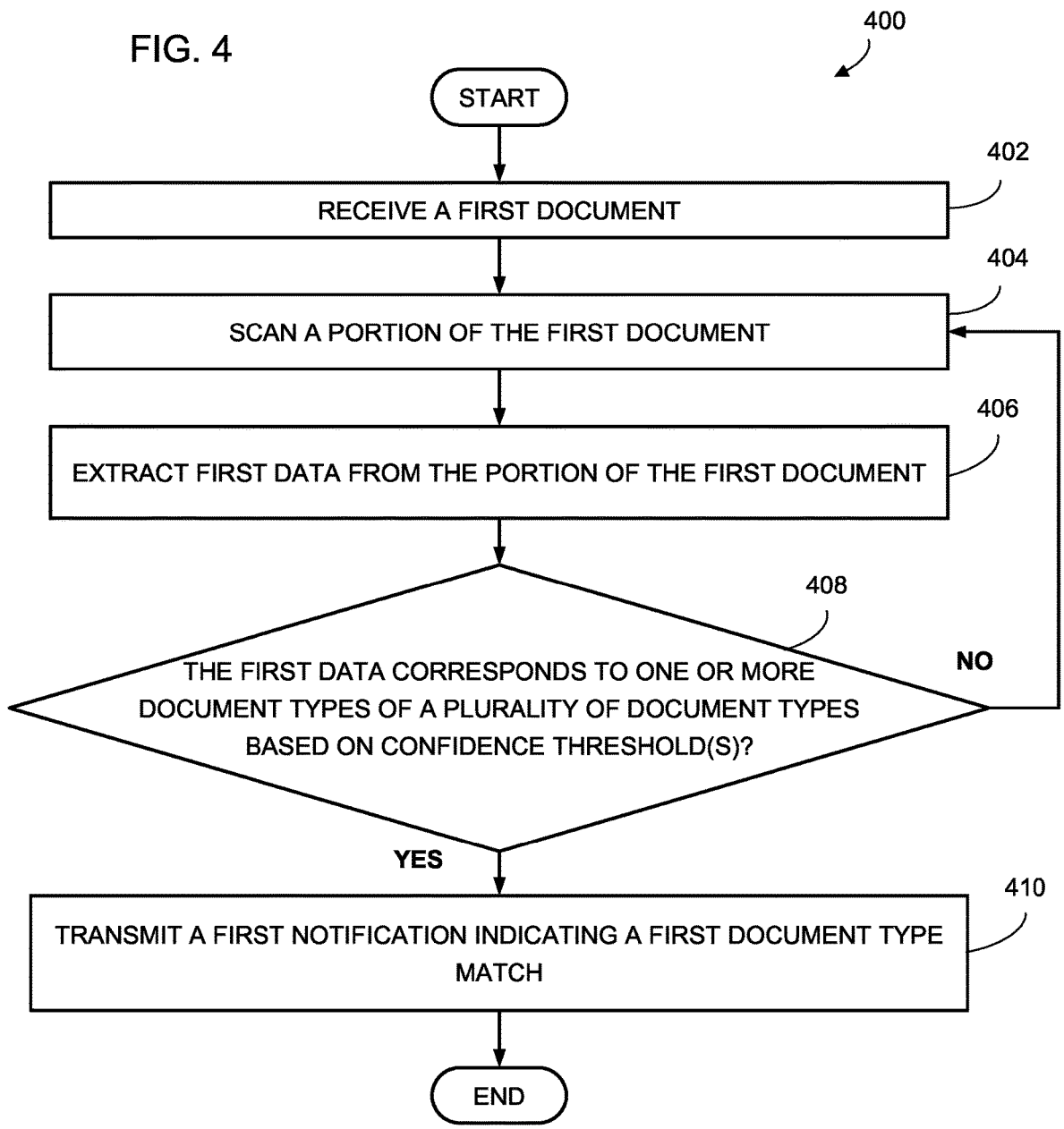

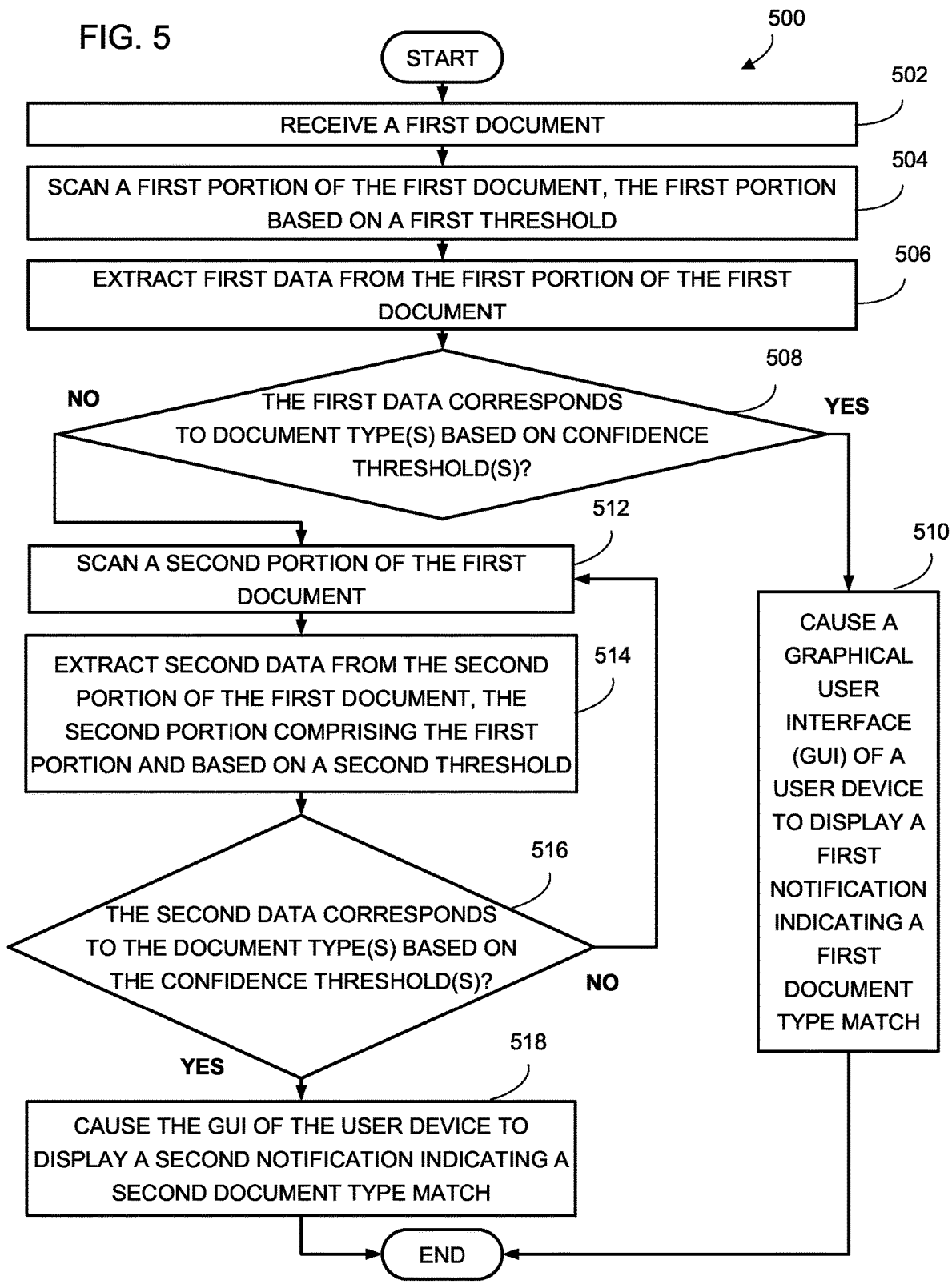

SYSTEMS AND METHODS FOR CLASSIFYING DOCUMENTS

The disclosed technology relates to systems and methods for classifying documents, and in particular, for classifying documents by iteratively scanning portions of a document until either a document classification confidence meets a targeted threshold, or a maximum portion size is met.

BACKGROUND

Many organizations benefit from document classification, especially those organizations involving many users, customers, employees, etc. Traditional systems and methods for document classification typically involve scanning documents in their entirety, and categorizing the documents according to type, such as financial, tax, employment, and the like. These systems and methods do not take into account any potentially sensitive or confidential information contained within documents to prevent exposure of such information, such as to third-party individuals or entities outside of the organization.

Accordingly, there is a need for improved systems and methods for classifying documents. Embodiments of the present disclosure are directed to this and other considerations.

SUMMARY

Disclosed embodiments may include a system for classifying documents. The system may include one or more processors, and memory in communication with the one or more processors and storing instructions that, when executed by the one or more processors, are configured to cause the system to perform an iterative method for classifying documents. The system may receive a first document. The system may then iteratively, until a document type is identified: scan a portion of the first document, extract first text data from the portion of the first document by performing optical character recognition (OCR) on the portion of the first document, and determine whether the document type is identified by, using a neural network (NN), determining whether the first text data corresponds to one or more document types of a plurality of document types based on one or more confidence thresholds, wherein the portion of the first document scanned increases by a predetermined amount (e.g., a percentage, a number of pixels, etc.) each iteration. Responsive to determining the first text data corresponds to the one or more document types based on the one or more confidence thresholds, the system may then cause a graphical user interface (GUI) of a user device to display a first notification indicating a first document type match.

In another embodiment, the system may include one or more processors, and memory in communication with the one or more processors and storing instructions that, when executed by the one or more processors, are configured to cause the system to perform an iterative method for classifying documents. The system may receive a first document. The system may then iteratively (e.g., until a document type is identified): scan a portion of the first document, extract first data from the portion of the first document, and determine whether the document type is identified by, using a machine learning model (MLM), determining whether the first data corresponds to one or more document types of a plurality of document types based on one or more confidence thresholds, wherein the portion of the first document scanned increases by a predetermined amount each iteration. Responsive to determining the first data corresponds to the one or more document types based on the one or more confidence thresholds, the system may transmit a first notification indicating a first document type match.

In another embodiment, the system may include one or more processors, and memory in communication with the one or more processors and storing instructions that, when executed by the one or more processors, are configured to cause the system to perform a method for classifying documents. The system may receive a first document. The system may scan a first portion of the first document, the first portion based on a first threshold (e.g., an amount or percentage). The system may extract first data from the first portion of the first document. The system may determine, using a classifier (e.g., an MLM, a NN, etc.), whether the first data corresponds to one or more document types of a plurality of document types based on one or more confidence thresholds. Responsive to determining the first data corresponds to the one or more document types based on the one or more confidence thresholds, the system may cause a GUI of a user device to display a first notification indicating a first document type match. Responsive to determining the first data does not correspond to the one or more document types based on the one or more confidence thresholds, the system may scan a second portion of the first document; extract second data from the second portion of the first document, the second portion comprising the first portion and based on a second threshold; and determine, using the classifier, whether the second data corresponds to the one or more document types based on the one or more confidence thresholds. Responsive to determining the second data corresponds to the one or more document types, the system may cause the GUI of the user device to display a second notification indicating a second document type match.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for classifying documents, in accordance with certain embodiments of the disclosed technology.

FIG. 4 is a flow diagram illustrating an exemplary method for classifying documents, in accordance with certain embodiments of the disclosed technology.

FIG. 5 is a flow diagram illustrating an exemplary method for classifying documents, in accordance with certain embodiments of the disclosed technology.

DETAILED DESCRIPTION

Examples of the present disclosure relate to systems and methods for classifying documents. In particular, the disclosed technology relates to systems and methods for iteratively scanning a portion of a received document, extracting data from the scanned portion, and determining whether the extracted data corresponds to one or more known document types based on one or more document classification confidences. With each iteration, the size of the scanned portion increases by a certain amount. The systems and methods described herein are necessarily rooted in computer and technology as they utilize classifiers, keyword matching models, or other MLMs (e.g., NNs) to determine whether data included in portions of a document correspond to certain document types (e.g., tax, financial, employment, etc.). These types of models provide unique computer technology that involves training the models to complete tasks, such as labeling, categorizing, identifying, or determining whether portions of a document indicate into which document type the full document may fall so the models learn how to label, categorize, identify, or determine how to categorize documents using a minimal amount of data to reduce exposure of potentially sensitive information. Importantly, examples of the present disclosure improve the speed with which computers can perform these automated tasks, by reducing the amount of data necessary to properly train the models to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
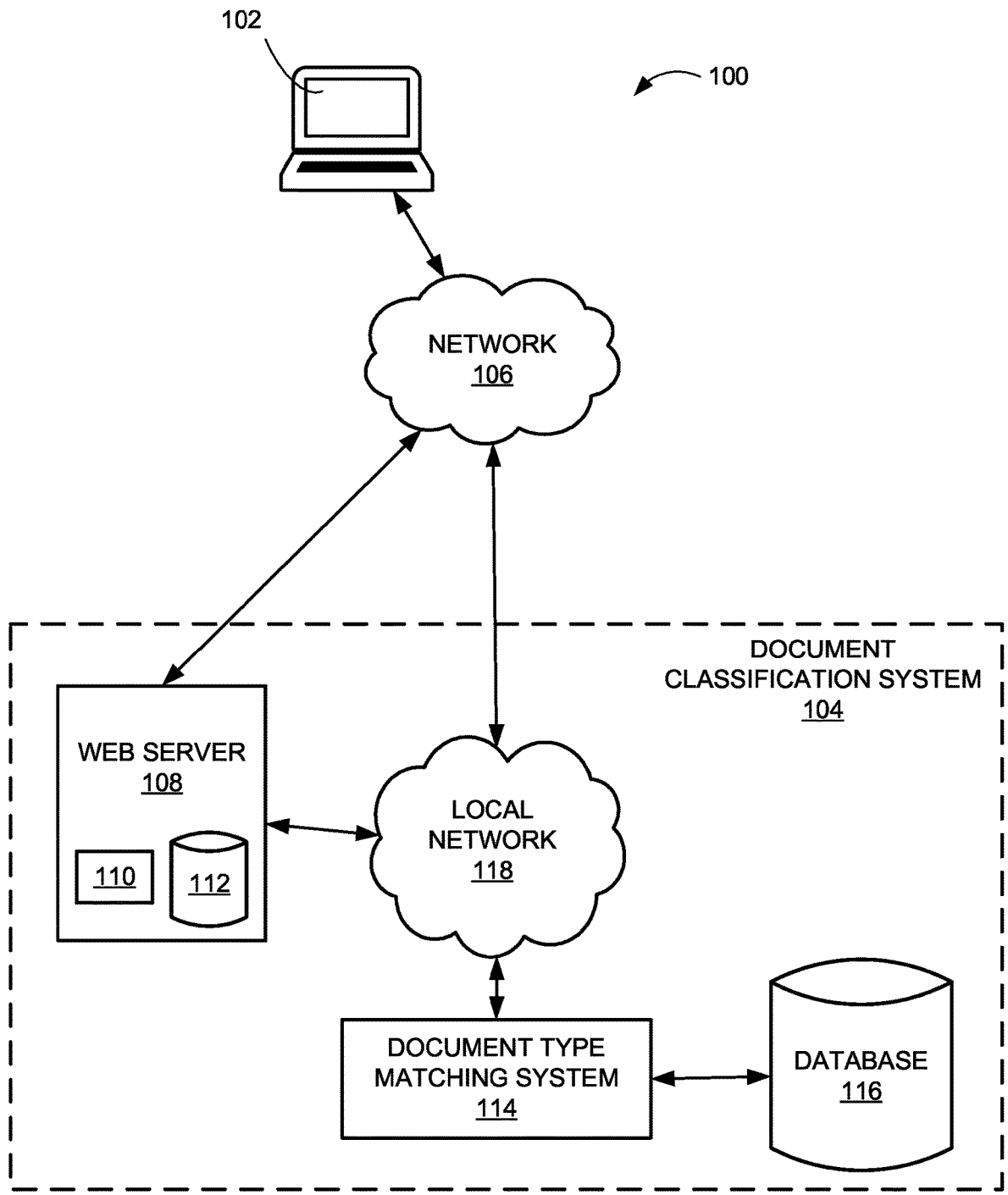
FIG. 1 is a block diagram of an example system that may be used to classify documents, according to an example implementation of the disclosed technology.

FIG. 1 is a block diagram of an example system that may be used to classify documents, according to an example implementation of the disclosed technology. The components and arrangements shown in FIG. 1 are not intended to limit the disclosed embodiments as the components used to implement the disclosed processes and features may vary. As shown, a user device 102 may communicate with a document classification system 104 via a network 106. In certain example implementations, the document classification system 104 may include a web server 108, a document type matching system 114, a database 116, and a local network 118.

In some embodiments, a user may operate the user device 102. The user device 102 can include one or more of a mobile device, smartphone, general purpose computer, tablet computer, laptop computer, telephone, PSTN landline, smart wearable device, voice command device, other mobile computing device, or any other device capable of communicating with network 106 and ultimately communicating with one or more components of the document classification system 104. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the document classification system 104. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Document classification system 104 may be associated with and optionally controlled by one or more entities such as a business, corporation, individual, partnership, or any other entity that provides one or more of goods, services, and consultations to individuals such as customers. In some embodiments, document classification system 104 may be controlled by a third party on behalf of another business, corporation, individual, or partnership. Document classification system 104 may include one or more servers and computer systems for performing one or more functions associated with products and/or services that the organization provides.

Web server 108 may include a computer system configured to generate and provide one or more websites accessible to customers, as well as any other individuals involved in accessing system 100's normal operations. Web server 108 may include a computer system configured to receive communications from user device 102 via for example, a mobile application, a chat program, an instant messaging program, a voice-to-text program, an SMS message, email, or any other type or format of written or electronic communication. Web server 108 may have one or more processors 110 and one or more web server databases 112, which may be any suitable repository of website data. Information stored in web server 108 may be accessed (e.g., retrieved, updated, and added to) via local network 118 and/or network 106 by one or more devices or systems (e.g., document type matching system 114) of system 100. In some embodiments, web server 108 may host websites or applications that may be accessed by user device 102. For example, web server 108 may host a financial service provider website that a user device may access by providing an attempted login that is authenticated by document type matching system 114. According to some embodiments, web server 108 may include software tools, similar to those described with respect to user device 102 above, that may allow web server 108 to obtain network identification data from user device 102.

Local network 118 may include any type of computer networking arrangement used to exchange data in a localized area, such as WiFi, Bluetooth™ Ethernet, and other suitable network connections that enable components of document classification system 104 to interact with one another and to connect to network 106 for interacting with components in the system 100 environment. In some embodiments, local network 118 may include an interface for communicating with or linking to network 106. In other embodiments, certain components of document classification system 104 may communicate via network 106, without a separate local network 118.

In accordance with certain example implementations of the disclosed technology, document classification system 104 may include one or more computer systems configured to compile data from a plurality of sources, for example, document type matching system 114, web server 108, and/or database 116. Document type matching system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, trainings, and business operations. Database 116 may also serve as a back-up storage device and may contain data and information that is also stored on, for example, database 250, as discussed below with reference to FIG. 2.

Although the preceding description describes various functions of a web server 108, a document type matching system 114, and a database 116, in some embodiments, some or all of these functions may be carried out by a single computing device or a plurality of computing devices in a (cloud) serverless system.

Figure 2:
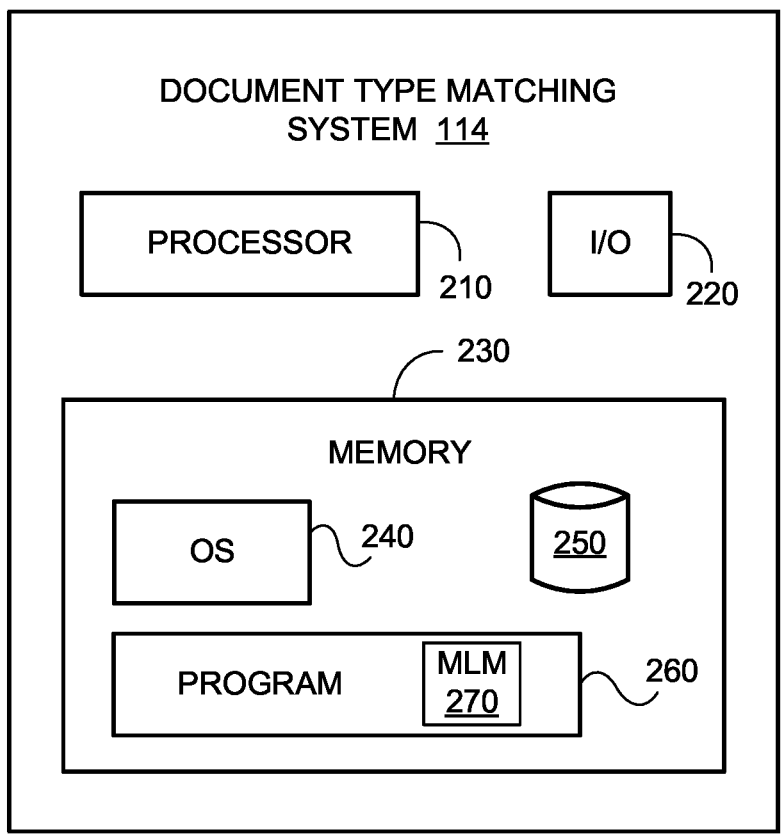
FIG. 2 is a block diagram of an example document type matching system used to determine whether a document type matches a known document type, according to an example implementation of the disclosed technology.

An example embodiment of document type matching system 114 is shown in more detail in FIG. 2. According to some embodiments, user device 102 and web server 108, as depicted in FIG. 1 and described above, may have a similar structure and components that are similar to those described with respect to document type matching system 114 shown in FIG. 2. As shown, document type matching system 114 may include a processor 210, an input/output ("I/O") device 220, a memory 230 containing an operating system ("OS") 240, a database 250, and a program 260. In some embodiments, program 260 may include an MLM 270 that may be trained, for example, to iteratively classify documents, as further discussed below. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, document type matching system 114 may be a single server or may be configured as a distributed computer system including multiple servers or computers that interoperate to perform one or more of the processes and functionalities associated with the disclosed embodiments. In some embodiments, document type matching system 114 may be one or more servers from a serverless or scaling server system. In some embodiments, document type matching system 114 may further include a peripheral interface, a transceiver, a mobile network interface in communication with processor 210, a bus configured to facilitate communication between the various components of document type matching system 114, and a power source configured to power one or more components of document type matching system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. Processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, processor 210 may be a single core processor that is configured with virtual processing technologies. In certain embodiments, processor 210 may use logical processors to simultaneously execute and control multiple processes. Processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, document type matching system 114 may include one or more storage devices configured to store information used by processor 210 (or other components) to perform certain functions related to the disclosed embodiments. In one example, document type matching system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, document type matching system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, document type matching system 114 may include memory 230 that may include one or more programs 260 to perform one or more functions of the disclosed embodiments. For example, in some embodiments, document type matching system 114 may additionally manage dialogue and/or other interactions with the customer via a program 260.

Processor 210 may execute one or more programs located remotely from document type matching system 114. For example, document type matching system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable document type matching system 114 to perform one or more of the processes and functionalities associated with the disclosed embodiments.

Document type matching system 114 may also be communicatively connected to one or more memory devices (e.g., databases) locally or through a network. The remote memory devices may be configured to store information and may be accessed and/or managed by document type matching system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Document type matching system 114 may also include one or more I/O devices 220 that may comprise one or more interfaces for receiving signals or input from devices and providing signals or output to one or more devices that allow data to be received and/or transmitted by document type matching system 114. For example, document type matching system 114 may include interface components, which may provide interfaces to one or more input devices, such as one or more keyboards, mouse devices, touch screens, track pads, trackballs, scroll wheels, digital cameras, microphones, sensors, and the like, that enable document type matching system 114 to receive data from a user (such as, for example, via user device 102).

In example embodiments of the disclosed technology, document type matching system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While document type matching system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of document type matching system 114 may include a greater or lesser number of components than those illustrated.

FIG. 3 provides a flow diagram illustrating an exemplary method 300 for classifying documents, in accordance with certain embodiments of the disclosed technology. Method 300 may be performed by one or more components of system 100 (e.g., web server 108 or document type matching system 114 of document classification system 104, or user device 102), as described above with respect to FIGS. 1 and 2.

In block 302 of FIG. 3, the system (e.g., via document classification system 104) may receive a first document. For example, a user may operate a user device (e.g., user device 102) to scan and upload a document into a document system. The user may be, for example, a customer or employee of an organization (e.g., a financial organization) that owns and/or operates the document system. The document may comprise, for example, financial information, tax information, employment information, etc. The document may comprise a single-page document, or a multi-page document, as further described below.

In block 304, the system (e.g., via document type matching system 114) may iteratively scan a portion of the first document until a document type is identified. That is, the system may begin an iterative process configured to scan an increasingly bigger portion of the first document until the system is able to confidently determine the document type of the first document, as further described below. In some embodiments, the portion of the document scanned may increase by a predetermined amount at each iteration, such as by a certain percentage (e.g., 2%, 5%, 7%, etc.), or a certain number of pixels (e.g., black pixels). In some embodiments, the portion of the document scanned may correspond to a portion at the top and/or bottom of the document (e.g., along the top and/or bottom margins of the document). In still other embodiments, the system may be configured to dynamically update the predetermined amount throughout the scanning process. For example, the system may be configured to begin iteratively scanning the top portion of the document, increasing by 1% with each iteration, until the system recognizes at least a certain amount of white or empty space (e.g., a gap between images or lines of text). The system may then be configured to increase the percentage of document scanned with each iteration until the system recognizes a next section of data (e.g., images, text, etc.), at which point the system may revert back to scanning at its initial 1% per iteration.

In some embodiments where the document comprises a multi-page document, the system may be configured to conduct the above-described iterative scanning process for each page of the document. That is, the system may recognize that a received document (e.g., in portable document form (PDF)) contains multiple pages. Within the multi-page document, there may be one or more document types (e.g., a financial document on pages 1-3, an employment document on pages 4-5, etc.). In such case, the system may be configured to move through the iterative scanning process for each individual page such that the system may determine a document type match for each page, or different groupings of pages, within the document, as further described below.

In some embodiments, the system may be configured to stop iteratively scanning the portion of the document when the predetermined amount reaches a maximum limitation (e.g., a certain percentage). For example, the system may be configured to stop scanning the document once the system has scanned at least the top and/or bottom 20% of the document (or each page of the document when scanning a multi-page document). This feature provides the added benefit of eliminating or at least reducing the amount of potentially sensitive or confidential information that may be exposed to a classification system or service, especially if that system or service is unaffiliated with the owner of the document system, as discussed above.

In block 306, the system (e.g., via document type matching system 114) may extract first text data from the portion of the first document by performing OCR on the portion of the first document. That is, in continuing the iterative process, the system may be configured to extract data the system recognizes, via OCR, as text data from the scanned portion (e.g., the top 5%) of the first document. In some embodiments, the system may be configured to extract other types of data, such as pictorial data (e.g., graphical). With each iteration, the system may be configured to extract text (or other) data from each next scanned portion of the first document, as discussed above.

In decision block 308, the system (via document type matching system 114) may determine whether the document type is identified by determining whether the first text data corresponds to one or more document types of a plurality of document types based on one or more confidence thresholds. That is, the system may be configured to compare the first text data to data contained within one or more known document types (e.g., financial, tax, employment, etc.), to determine a likelihood that a document type match has been found based on one or more document classification confidences. For example, the system may recognize that the first text data extracted from the top 5% of the first document comprises the word "W-2" and thus may determine, based on a 90% likelihood, the first document is a tax document. The one or more confidence thresholds may be predetermined, such as preset percentages (e.g., 75%, 85%, 95%, etc.), or may be relative, such as based on a comparison of features contained within each document type of the plurality of known document types. The system may be configured to repeat the above iterative process until the correspondence between the first text data and the one or more document types meets or exceeds one or more confidence thresholds. In some embodiments, different document types may be associated with different respective confidence thresholds. For example, the system may be configured to determine a first document, or a section of pages therein, is an employment document based on an 80% likelihood versus a tax document based on a 95% likelihood. This feature provides the added benefit of ensuring a higher degree of confidence in document matching for document types that may contain different or more sensitive information compared to other document types.

In some embodiments, the system may perform the steps outlined in decision block 308 using a trained model, such as a classifier, a keyword matching model, a Natural Language Processing (NLP) model, or another MLM, such as a NN. The model may be trained by providing the model with a training data that includes one or more labels corresponding to one or more keywords, punctuations, formatting features, images, etc., of known document types. Based on the training data, the model may classify unlabeled data sets such as new document features and/or document types.

In block 310, responsive to determining the first text data corresponds to the one or more document types based on the one or more confidence thresholds, the system (e.g., via document classification system 104) may cause a GUI of a user device to display a first notification indicating a first document type match. That is, if and when the system is able to determine the data extracted from a scanned portion of the first document—whether it be the top and/or bottom 2%, 5%, 10%, etc.—corresponds to one or more known document types according to one or more document classification confidences, the system may cause a GUI of a user device (e.g., user device 102) to display a notification that a document type match has been found. In some embodiments, the notification may include on what confidence (e.g., a 90% likelihood) the document type match is based. In some embodiments, where the system is configured to continue iteratively scanning until a certain document classification confidence has been satisfied, as described above, the notification may include an indication that this confidence requirement has been met. As discussed above, in certain embodiments, the system may be configured to stop scanning the portion of the document upon reaching the predetermined maximum limitation (e.g., the top and/or bottom 20% of the first document). Thus, in some embodiments where the system has not yet determined a document type match by the time it reaches the maximum limitation, the system may be configured to perform some other action, such as labeling the document type as "undetermined," or causing a GUI of the user device to transmit a notification indicating an error.

Method 400 of FIG. 4 is similar to method 300 of FIG. 3, except that method 400 may include any MLM rather than a NN specifically, may include any data rather than text data specifically, and may transmit a notification indicating a document type match rather than causing a GUI to display such notification. The descriptions of blocks 402, 404, 406, and 408 may be the same as or similar to the respective descriptions of blocks 302, 304, 306, and 308 of method 300 and as such, are not repeated herein for brevity.

In block 410, responsive to determining the first data corresponds to the one or more document types based on the one or more confidence thresholds, the system (e.g., via document classification system 104) may transmit a first notification indicating a first document type match. That is, if and when the system is able to determine the data extracted from a scanned portion of the first document—whether it be the top and/or bottom 2%, 5%, 10%, etc.—corresponds to one or more known document types according to one or more document classification confidences, the system may transmit a notification that a document type match has been found. The notification may include one or more of the same or similar indications or information as discussed above with respect to block 310. In some embodiments, the system may be configured to transmit an internal notification between one or more components of document classification system 104 (e.g., web server 108, document type matching system 114, database 116, and/or local network 118). In some embodiments, the system may be configured to transmit a notification to a specific user device (e.g., user device 102). For example, a system or account administrator may set up his or her smartphone to receive a text, email, and/or push notification at certain points throughout a document classification process (e.g., when a document type match has been found, when an error has been identified, etc.).

Method 500 of FIG. 5 is also similar to method 300 of FIG. 3, except that method 500 may include extracting different types of data from different portions of a document. The descriptions of blocks 502, 504, 506, 508, and 510 may be the same as or similar to the respective descriptions of blocks 302, 304, 306, 308, and 310 of method 300 and as such, are not repeated herein for brevity.

In block 512, responsive to determining the first data does not correspond to the one or more document types based on the one or more confidence thresholds, the system (e.g., via document type matching system 114) may scan a second portion of the first document. That is, as described above, the system may be configured to iteratively scan portions of the first document (e.g., a percentage or a number of pixels) until the system can identify a document type match. For example, if the system previously scanned the top 2% of the first document as its first portion and could not identify a document type based on the extracted first data included in that top 2%, the system may be configured to scan an additional 2%, making the total second scanned portion the top 4% of the first document.

In block 514, the system (e.g., via document type matching system 114) may extract second data from the second portion of the first document, the second portion comprising the first portion and based on a second threshold. In some embodiments, the second data may be a different type of data from the first data previously extracted from the first portion of the first document (as in block 506). For example, the system may have previously extracted text data from the first portion of the document. Upon scanning the second portion of the first document, the system may be configured to extract pictorial data from the second portion of the document. In this way, the system may be configured to increase its chances of successfully identifying a document type match by extracting different types of data upon each iteration of the scanning process.

In block 516, the system (via document type matching system 114) may determine whether the document type is identified by determining whether the second data corresponds to one or more document types of a plurality of document types based on one or more confidence thresholds. This step is similar to block 508 (described with respect to block 308 of FIG. 3) except that the system may be comparing a different second data type as compared to the first data type, as discussed above.

In block 518, responsive to determining the second data corresponds to the one or more document types based on the one or more confidence thresholds, the system (e.g., via document classification system 104) may cause a GUI of a user device to display a second notification indicating a second document type match. In some embodiments, causing the GUI to display the second notification may be a same or similar process as discussed above with respect to block 310. In some embodiments, the second notification may comprise different information than the first notification as described with respect to block 310. For example, the second notification may provide an indication of whether the system switched data types in scanning the second portion compared to the first portion of the first document.

Alternatively, responsive to determining the second data does not correspond to the one or more document types based on the one or more confidence thresholds, the system (e.g., via document classification system 104) may be configured to begin back at block 512 to scan a next portion of the first document.

EXAMPLE USE CASE

The following example use case describes an example of a typical user flow pattern. This section is intended solely for explanatory purposes and not in limitation.

In one example, a user may use a personal laptop to scan and upload a first document to a document system owned and operated by a financial organization. The organization may add the first document to an assortment of other scanned documents that the organization wishes to have classified by a third-party service. The organization may wish to classify all documents contained in the document system without exposing any potentially sensitive or personal customer information to the third-party service. The organization's document system may thus be configured to first scan the top 5% of the first document to send to the third-party service. The third-party service may use OCR to extract first text data from that top 5%. The third-party service may then use a trained model to determine whether the first text data taken from the top 5% corresponds to one or more known document types (e.g., tax, wages, employment, etc.) based on one or more document classification confidences, such as a 75%, 85%, and 95% likelihood of an accurate document type match. The third-party service may determine the first text data does not correspond to the one or more known document types based on one or more confidences, and may then trigger the document system to scan and send the top 10% of the first document. The third-party service may again use OCR to extract second text data from the top 10% to determine, using the trained model, whether the second text data taken from the top 10% corresponds to one or more known document types based on the one or more confidences.

In some embodiments, this process may be repeated until a maximum portion (e.g., 20%) of the top and/or bottom of the first document is scanned to ensure any potentially sensitive information contained in the body of the first document is not exposed to the third-party service.

In some embodiments, at the end of each iteration, the document system may be configured to cause the GUI of the user device to display a notification indicating either a matching document type was found based on a certain allowable confidence, or an error indicating no correspondence with a known document type was found based on any of the allowable confidences.

In some embodiments, rather than using a third-party classification service, the owner and/or operator of the document system may also perform the classification of documents.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive a first document; iteratively, until a document type is identified: scan a portion of the first document; extract first text data from the portion of the first document by performing optical character recognition (OCR) on the portion of the first document; and determine whether the document type is identified by, using a neural network (NN), determining whether the first text data corresponds to one or more document types of a plurality of document types based on one or more confidence thresholds, wherein the portion of the first document scanned increases by a predetermined amount each iteration; and responsive to determining the first text data corresponds to the one or more document types based on the one or more confidence thresholds, cause a graphical user interface (GUI) of a user device to display a first notification indicating a first document type match.

Clause 2: The system of clause 1, wherein the predetermined amount comprises a percentage.

Clause 3: The system of clause 1, wherein the instructions are further configured to cause the system to: stop iteratively scanning the portion of the first document when the predetermined amount reaches a maximum limitation.

Clause 4: The system of clause 1, wherein each of the one or more confidence thresholds indicates a respective likelihood that the first text data corresponds to the one or more document types.

Clause 5: A system comprising: one or more processors; and a memory in communication with the one or more processors and storing instructions that, when executed by the one or more processors, are configured to cause the system to: receive a first document; iteratively, until a document type is identified: scan a portion of the first document; extract first data from the portion of the first document; and determine whether the document type is identified by, using a machine learning model (MLM), determining whether the first data corresponds to one or more document types of a plurality of document types based on one or more confidence thresholds, wherein the portion of the first document scanned increases by a predetermined amount each iteration; and responsive to determining the first data corresponds to the one or more document types based on the one or more confidence thresholds, transmit a first notification indicating a first document type match.

Clause 6: The system of clause 5, wherein the first data comprises text data, and wherein extracting the first data from the portion of the first document is conducted by performing optical character recognition (OCR) on the portion of the first document.

Clause 7: The system of clause 5, wherein the MLM comprises a neural network (NN).

Clause 8: The system of clause 5, wherein the predetermined amount comprises a percentage.

Clause 9: The system of clause 5, wherein the instructions are further configured to cause the system to: stop iteratively scanning the portion of the first document when the predetermined amount reaches a maximum limitation.

Clause 10: The system of clause 5, wherein the instructions are further configured to cause the system to: cause a graphical user interface (GUI) of a user device to display the first notification.

Clause 11: A system comprising: one or more processors; and a memory in communication with the one or more processors and storing instructions that, when executed by the one or more processors, are configured to cause the system to: receive a first document; scan a first portion of the first document, the first portion based on a first threshold; extract first data from the first portion of the first document; determine, using a classifier, whether the first data corresponds to one or more document types of a plurality of document types based on one or more confidence thresholds; responsive to determining the first data corresponds to the one or more document types based on the one or more confidence thresholds, cause a graphical user interface (GUI) of a user device to display a first notification indicating a first document type match; and responsive to determining the first data does not correspond to the one or more document types based on the one or more confidence thresholds: scan a second portion of the first document; extract second data from the second portion of the first document, the second portion comprising the first portion and based on a second threshold; determine, using the classifier, whether the second data corresponds to the one or more document types of the plurality of document types based on the one or more confidence thresholds; and responsive to determining the second data corresponds to the one or more document types based on the one or more confidence thresholds, cause the GUI of the user device to display a second notification indicating a second document type match.

Clause 12: The system of clause 11, wherein the first threshold comprises a first percentage and the second threshold comprises a second percentage.

Clause 13: The system of clause 12, wherein the first percentage is less than the second percentage.

Clause 14: The system of clause 12, wherein the first and second thresholds further comprise a top section and/or a bottom section of the first document.

Clause 15: The system of clause 11, wherein the instructions are further configured to cause the system to: responsive to determining the first data does not correspond to the one or more document types based on the one or more confidence thresholds: cause the GUI of the user device to display a third notification indicating an error.

Clause 16: The system of clause 11, wherein the instructions are further configured to cause the system to: responsive to determining the second data does not correspond to the one or more document types based on the one or more confidence thresholds: scan a third portion of the first document; extract third data from the third portion of the first document, the third portion comprising the first portion and the second portion and based on a third threshold; determine, using the classifier, whether the third data corresponds to the one or more document types of the plurality of document types based on the one or more confidence thresholds; and responsive to determining the third data corresponds to the one or more document types based on the one or more confidence thresholds, cause the GUI of the user device to display a third notification indicating a third document type match.

Clause 17: The system of clause 16, wherein the first, the second, and the third thresholds are less than or equal to a maximum limitation.

Clause 18: The system of clause 11, wherein the classifier comprises a machine learning model (MLM).

Clause 19: The system of clause 18, wherein the MLM comprises a neural network (NN).

Clause 20: The system of clause 11, wherein the first data and the second data comprise text data.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smartphones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
a memory in communication with the one or more processors and storing instructions that, when executed by the one or more processors, are configured to cause the system to:
receive a first single-page document;
iteratively, until a document type is identified:
scan a portion of the first single-page document, wherein the portion is a fraction of the first single-page document;
extract first text data from the portion of the first single-page document by performing optical character recognition (OCR) on the portion of the first single-page document; and
determine whether the document type is identified by, using a neural network (NN), determining whether the first text data corresponds to one or more document types of a plurality of document types based on one or more confidence thresholds, wherein the portion of the first single-page document scanned increases by a predetermined amount each iteration, the predetermined amount being dynamically updated each iteration by:
determining whether a predefined amount of empty space is identified within the portion of the first single-page document;
responsive to determining the predefined amount of empty space is identified within the portion of the first single-page document, increasing the portion of the first single-page document scanned by a second predetermined amount each iteration until second text data is identified; and responsive to the second text data being identified, automatically reverting to scanning the first single-page document based on an initial predetermined amount with each iteration; and responsive to determining the first text data corresponds to the one or more document types based on the one or more confidence thresholds, cause a graphical user interface (GUI) of a user device to display a first notification indicating a first document type match.

2. The system of claim 1, wherein the predetermined amount comprises a percentage.

3. The system of claim 1, wherein the instructions are further configured to cause the system to:
stop iteratively scanning the portion of the first single-page document when the predetermined amount reaches a maximum limitation.

4. The system of claim 1, wherein each of the one or more confidence thresholds indicates a respective likelihood that the first text data corresponds to the one or more document types.

5. A system comprising:
one or more processors; and
a memory in communication with the one or more processors and storing instructions that, when executed by the one or more processors, are configured to cause the system to:
receive a first single-page document;
iteratively, until a document type is identified:
scan a portion of the first single-page document, wherein the portion is a fraction of the first single-page document;
extract first data from the portion of the first single-page document; and
determine whether the document type is identified by, using a machine learning model (MLM), determining whether the first data corresponds to one or more document types of a plurality of document types based on one or more confidence thresholds, wherein the portion of the first single-page document scanned increases by a predetermined amount each iteration, the predetermined amount being dynamically updated each iteration by:
determining that a predefined amount of empty space is identified within the portion of the first single-page document;
responsive to determining the predefined amount of empty space is identified within the portion of the first single-page document, increasing the portion of the first single-page document scanned by a second predetermined amount each iteration until second text data is identified; and
responsive to the second text data being identified, automatically reverting to scanning the first single-page document based on an initial predetermined amount with each iteration; and
responsive to determining the first data corresponds to the one or more document types based on the one or more confidence thresholds, transmit a first notification indicating a first document type match.

6. The system of claim 5, wherein the first data comprises text data, and wherein extracting the first data from the portion of the first single-page document is conducted by performing optical character recognition (OCR) on the portion of the first single-page document.

7. The system of claim 5, wherein the MLM comprises a neural network (NN).

8. The system of claim 5, wherein the predetermined amount comprises a percentage.

9. The system of claim 5, wherein the instructions are further configured to cause the system to:
stop iteratively scanning the portion of the first single-page document when the predetermined amount reaches a maximum limitation.

10. The system of claim 5, wherein the instructions are further configured to cause the system to:
cause a graphical user interface (GUI) of a user device to display the first notification.

11. A system comprising:
one or more processors; and
a memory in communication with the one or more processors and storing instructions that, when executed by the one or more processors, are configured to cause the system to:
receive a first single-page document;
scan a first portion of the first single-page document, the first portion based on a first threshold and comprising a first fraction of the first single-page document;
extract first data from the first portion of the first single-page document;
determine, using a classifier, whether the first data corresponds to one or more document types of a plurality of document types based on one or more confidence thresholds;
responsive to determining the first data corresponds to the one or more document types based on the one or more confidence thresholds, cause a graphical user interface (GUI) of a user device to display a first notification indicating a first document type match; and
responsive to determining the first data does not correspond to the one or more document types based on the one or more confidence thresholds:
iteratively, until a second document type is identified:
scan a second portion of the first single-page document, wherein the second portion is a second fraction of the first single-page document;
extract second data from the second portion of the first single-page document, the second portion comprising the first portion and based on a second threshold;
determine, using the classifier, whether the second data corresponds to the one or more document types of the plurality of document types based on the one or more confidence thresholds, wherein the second portion increases by a dynamically updated predetermined amount each iteration; and
responsive to determining the second data corresponds to the one or more document types based on the one or more confidence thresholds, cause the GUI of the user device to display a second notification indicating a second document type match.

12. The system of claim 11, wherein the first threshold comprises a first percentage and the second threshold comprises a second percentage.

13. The system of claim 12, wherein the first percentage is less than the second percentage.

14. The system of claim 12, wherein the first and second thresholds further comprise a top section or a bottom section of the first single-page document.

15. The system of claim 11, wherein the instructions are further configured to cause the system to:

responsive to determining the first data does not correspond to the one or more document types based on the one or more confidence thresholds:
    cause the GUI of the user device to display a third notification indicating an error.

16. The system of claim 11, wherein the instructions are further configured to cause the system to:
responsive to determining the second data does not correspond to the one or more document types based on the one or more confidence thresholds:
    scan a third portion of the first single-page document;
    extract third data from the third portion of the first single-page document, the third portion comprising the first portion and the second portion and based on a third threshold;
    determine, using the classifier, whether the third data corresponds to the one or more document types of the plurality of document types based on the one or more confidence thresholds; and
    responsive to determining the third data corresponds to the one or more document types based on the one or more confidence thresholds, cause the GUI of the user device to display a third notification indicating a third document type match.

17. The system of claim 16, wherein the first, the second, and the third thresholds are less than or equal to a maximum limitation.

18. The system of claim 11, wherein the classifier comprises a machine learning model (MLM).

19. The system of claim 18, wherein the MLM comprises a neural network (NN).

20. The system of claim 11, wherein the first data and the second data comprise text data.

* * * * *